(12) United States Patent
Wishnatzki et al.

(10) Patent No.: US 7,878,396 B2
(45) Date of Patent: Feb. 1, 2011

(54) SYSTEM AND METHOD FOR TRACKING ORIGINS OF PRODUCE

(75) Inventors: Gary Wishnatzki, Tampa, FL (US); Minor Bolanos, Tampa, FL (US)

(73) Assignee: Virtualone, LLC, Plant City, FL (US)

( * ) Notice: Subject to any disclaimer, the term of this patent is extended or adjusted under 35 U.S.C. 154(b) by 1 day.

(21) Appl. No.: 12/060,734

(22) Filed: Apr. 1, 2008

(65) Prior Publication Data
US 2009/0242631 A1    Oct. 1, 2009

(51) Int. Cl.
G06F 19/00    (2006.01)
(52) U.S. Cl. ................................ 235/385; 235/463
(58) Field of Classification Search .............. 235/385, 235/463
See application file for complete search history.

(56) References Cited

U.S. PATENT DOCUMENTS

| | | | |
|---|---|---|---|
| 5,166,500 A * | 11/1992 | Yoon et al. | 235/462.07 |
| 5,478,990 A | 12/1995 | Montanari et al. | |
| 5,783,810 A * | 7/1998 | Kelly, Jr. | 235/385 |
| 6,945,459 B2 | 9/2005 | Flanagan | |
| 6,969,003 B2 | 11/2005 | Havens et al. | |
| 2003/0226787 A1 | 12/2003 | Buisman et al. | |
| 2005/0075900 A1* | 4/2005 | Arguimbau, III | 705/1 |
| 2005/0086132 A1 | 4/2005 | Kanitz et al. | |
| 2006/0111845 A1 | 5/2006 | Forbis et al. | |
| 2007/0293980 A1 | 12/2007 | Gudjonsson et al. | |

FOREIGN PATENT DOCUMENTS

| | | |
|---|---|---|
| JP | 2002-297625 | 10/2002 |
| KR | 10-1999-0019378 | 3/1999 |
| KR | 1999-019378 | * 3/1999 |
| KR | 10-2004-0110912 | 12/2004 |
| KR | 10-2006-0131500 | 12/2006 |

* cited by examiner

*Primary Examiner*—Thien M Le
(74) *Attorney, Agent, or Firm*—Larson & Larson, P.A.; Frank Liebenow; Justin Miller (57) ABSTRACT

An application for a method for tracking produce delivered to a consumer includes providing a field box and a plurality of containers for holding produce, the containers fitting within the field box. A master label that has a master label barcode and a plurality of sub-labels is provided. The master label barcode has a sequence of digital values; the sequence of digital values uniquely distinguishes each master label. Each sub label has a sub-label identifier related to or equivalent to the master label bar-code. The master label is affixed to the field box and each of the sub-labels from the master label is affixed to one of the containers. The containers are then filled with produce and placed into the field box. The master label barcode is captured with a scanner and either now or at a later time, the captured master label barcode and an identification of the origin of the produce are transferred to a server where they are storing in a barcode tracking database.

20 Claims, 9 Drawing Sheets

| | |
|---|---|
| FIRST NAME: | |
| LAST NAME: | |
| EMAIL ADDRESS: | |
| PHONE NUMBER: | |
| BARCODE NUMBER: | |
| REPEAT BARCODE: | |
| PLACE OF PURCHASE: | |
| COMMENTS: | |

PRODUCT ISSUE:
　○ NOT RIPE
　○ SPOILED/MOLD
　○ QUANTITY LOW ←—92
　○ TASTE BAD

SYSTEM AND METHOD FOR TRACKING ORIGINS OF PRODUCE

FIELD OF THE INVENTION

This invention relates to the field of tracking produce and more particularly to a system and method for tracking the origin of produce for health, safety and product feedback.

BACKGROUND OF THE INVENTION

The delivery of safe produce is performed by many farms in the United States and elsewhere. There have been incidences in which a small amount of produce was contaminated. For example, in 2007, an *E. coli* outbreak was reported and traced back to spinach. This contamination killed three people and sickened more than 200. Authorities isolated the *E. coli* strain and found that it originated from cattle feces and wild pig feces in river water used to irrigate the effected spinach farm. Since the outbreak, lawmakers in Congress have pushed for regular inspection of processing plants. Additionally, the FDA has announced voluntary guidelines for preventing food poisoning in fresh produce.

When such an outbreak occurs, produce from the entire farm is recalled, but often, only a portion of the produce is tainted. In the above example, all spinach from that farm and other farms was recalled and destroyed. There are many farms in which some fields are managed differently than other fields. For example, one field is irrigated with river water and another is irrigated with well water or water from a different source. Another example is one field having one set of pickers and another field having a different set of pickers. If one of the pickers contracts a contagious disease, there is no need to destroy crops from the fields that he or she didn't contact.

Similarly, once the produce is picked, it becomes indistinguishable from similar produce picked by other pickers on the same field or different fields. There is no way for the consumer or distributor/store to provide feedback to the growers regarding product quality, etc.

What is needed is a system and method for tracking produce back to individual fields and/or pickers.

SUMMARY OF THE INVENTION

In one embodiment, a system for tracking produce delivered to a consumer is disclosed including a field box and a plurality of containers that fit within the field box for holding the produce. A master label is affixed to the field box. The master label has a master label barcode and a plurality of sub-labels. The master label barcode has a sequence of digital values that uniquely differentiate each master label. Each sub label has a sub-label identifier that is related to or equivalent to the master label bar-code. The system also includes a server and a scanner. Software running on the scanner captures a value of the master label barcode and the origin of the produce then transfers (now or later) the value of the master label barcode and the origin of the produce to the server. Software running on the server receives the value of the master label barcode and the origin of the produce and stores them in a barcode tracking database for later access.

In another embodiment, a method for tracking produce delivered to a consumer is disclosed including providing a field box and a plurality of containers for holding produce, the containers fitting within the field box. A master label that has a master label barcode and a plurality of sub-labels is provided. The master label barcode has a sequence of digital values; the sequence of digital values uniquely distinguishes each master label. Each sub label has a sub-label identifier related to or equivalent to the master label bar-code. The master label is affixed to the field box and each of the sub-labels from the master label is affixed to one of the containers. The containers are then filled with produce and placed into the field box. The master label barcode is captured with a scanner and either now or at a later time, the captured master label barcode and the origin of the produce are transferred to a server where they are storing in a barcode tracking database.

In another embodiment, a method for tracking produce delivered to a consumer is disclosed including providing a field box and a plurality of clamshell containers that fit within the field box for holding the produce. A master label is provided that has a master label barcode and a plurality of sub-labels. Each sub label has a sub-label identifier that relates to the master label bar-code. The master label barcode has a sequence of digital values that uniquely distinguishes the master label. The master label is affixed to the field box and each of the sub-labels are peeled from the master label and affixed to each of the clamshell containers. Next, the clamshell containers are filled with produce then placed into the field box. Once full, the field box is delivered to a harvest manager where the harvest manager captures the master label barcode and an employee badge barcode from an employee badge with a scanner. The employee badge is associated with the produce picker. Now or at a later time, the captured master label barcode and the employee badge barcode is transferred to a server where they are received and stored in a barcode tracking database.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

Figure 1:
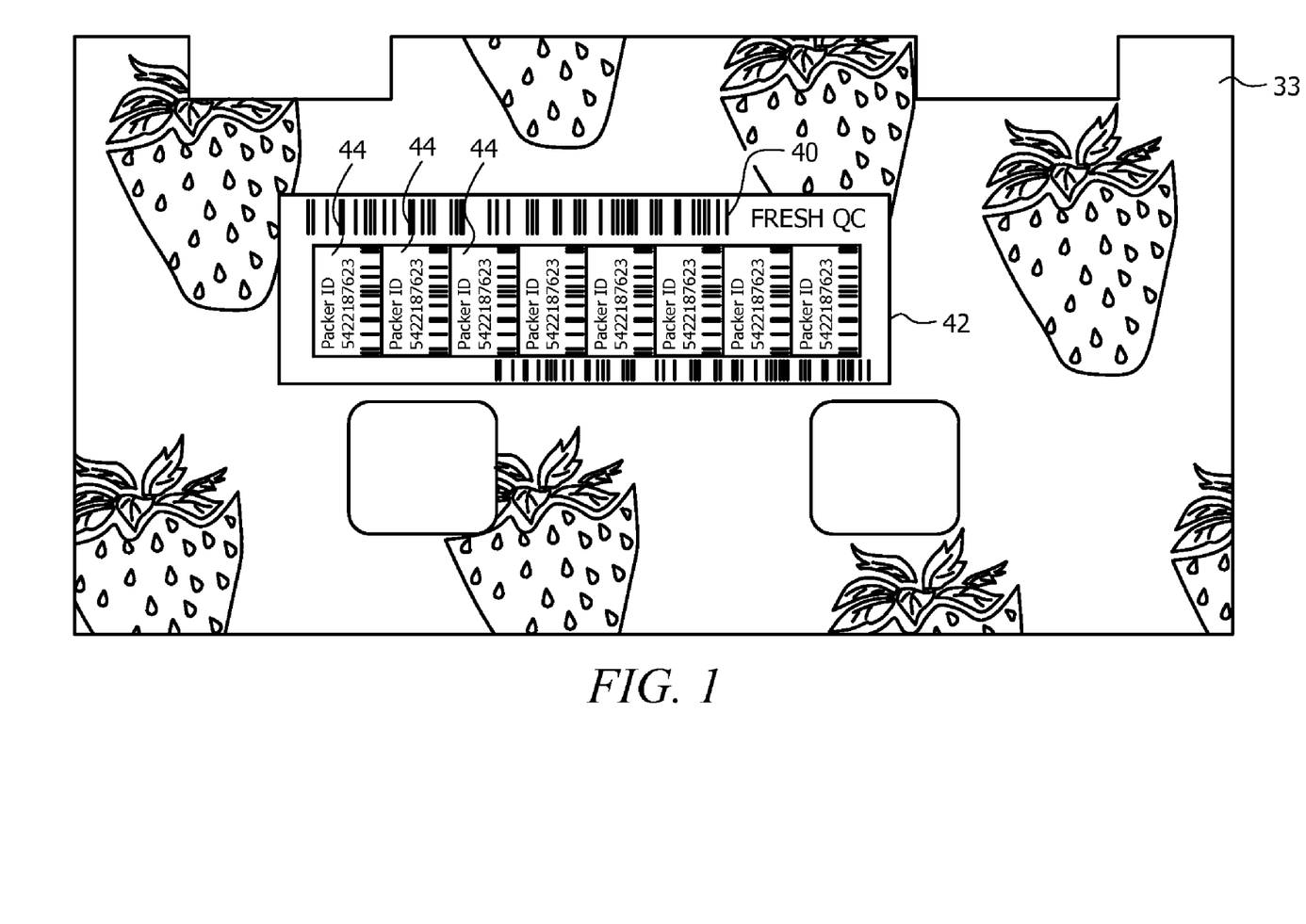
FIG. 1 illustrates a plan view of a label system of the present invention on a field box.

Referring to FIG. 1, a plan view of a label system of the present invention on a field box is shown. The label 42 is affixed to a surface of the field box 33. The label 42 has a barcode 40 that includes a sequence of digital values (for example, numbers). The label 42 also includes a plurality of sub-labels or child labels 44, in this example eight sub-labels 44. Any number of sub-labels 44 is possible, one for each sub-container held within the over-box or field box 33. Each sub-label 44 has a sub-label identifier that relates to the barcode 40. In some embodiments, the sub-label identifier is a printed series of characters that relate to the sequence of digital values such as "5422187623." I some embodiments, the sub-label identifier includes a barcode that relates to the sequence of digital values. There is at least one sub-label 44 for each sub-container and, in some embodiments, one or more spare sub-labels 44 are provided in case one does not stick or is destroyed.

The field box 33 is a container that holds two or more sub-boxes or sub-containers. For example purposes, the term "clamshell" is used throughout this application to refer to the sub-boxes or sub-containers.

Figure 2:
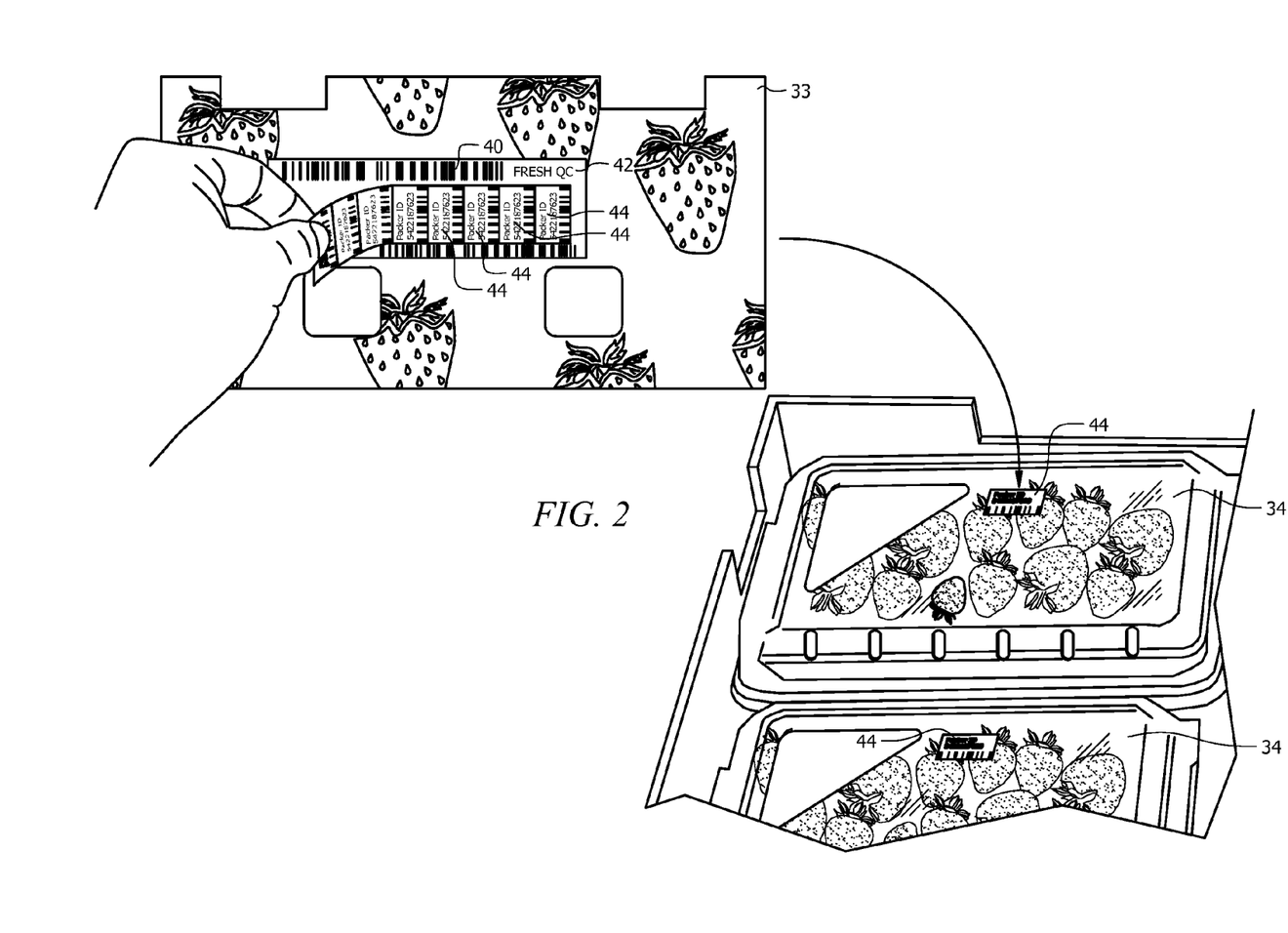
FIG. 2 illustrates a perspective view of a label system of the present invention in use.

Referring to FIG. 2, a perspective view of a label system of the present invention in use is shown. Before or after filling the clamshell boxes 34 with produce, the sub-labels 44 are peeled from the master label 42 and, each sub-label 44 is affixed to each of the clamshell boxes 34 and the clamshell boxes 34 are placed in the field box 33. Note that the barcode 40 on the master label 42 is the same as or related to the sub-label identifier (e.g., barcode 43 or printed digits) on each of the sub-labels 44. In one embodiment, the barcode 40 on the master label 42 has the same numerical value as the sub-label identifier (e.g., barcode 43 or printed digits) on each of the sub-labels 44. In alternate embodiments, some of the numerical values are the same and some differ to distinguish the individual sub-labels. In all embodiments, the barcode 40 is unique, in that, no two sets of labels have the same barcode so as to permit identification of the produce by the barcode.

Figure 3:
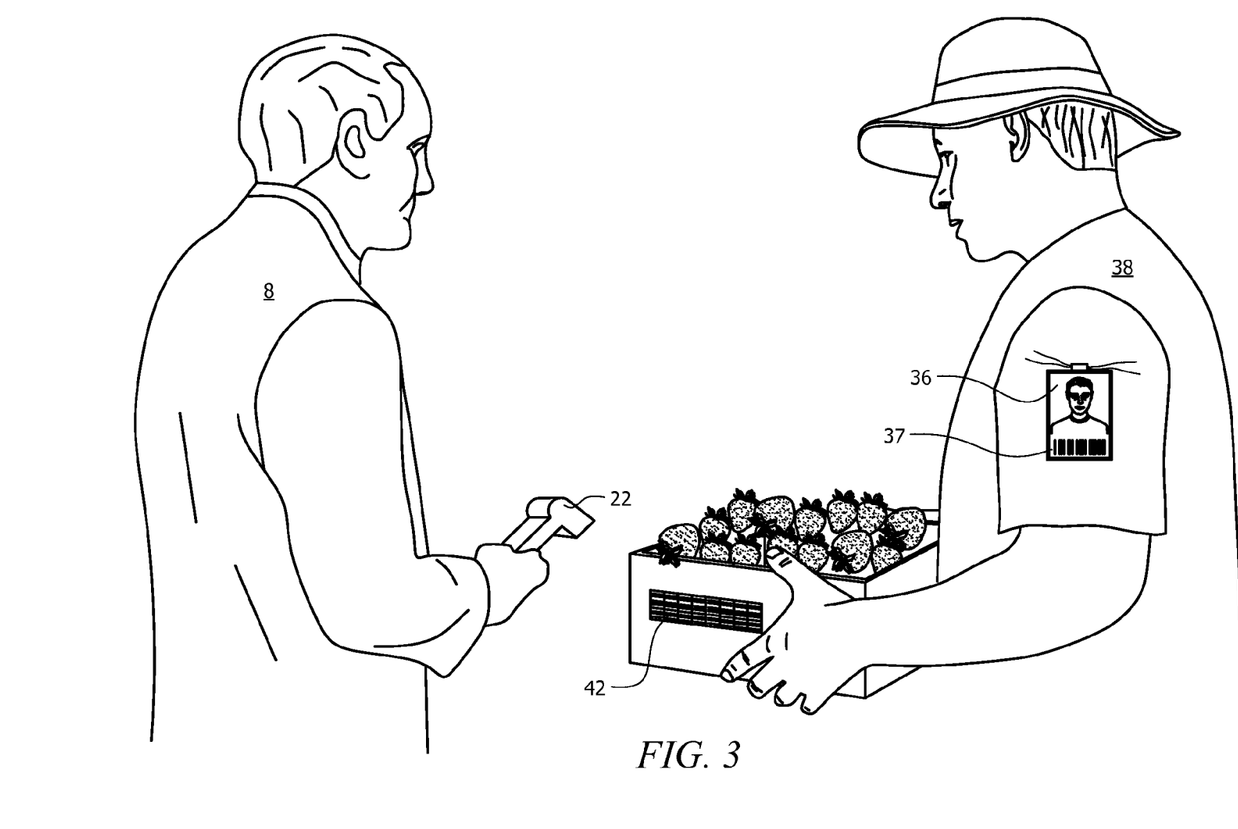
FIG. 3 illustrates a perspective view of a system of the present invention.

Referring to FIG. 3, a perspective view of a system of the present invention is shown. In this example, the picker 38 delivers the field box 33 to a harvest manager or foreman 8 who uses a scanner 22 to scan the barcode 42. In some embodiments, an employee badge barcode 37 on an employee badge 36 of the produce picker 38 is scanned to relate the barcode 40 of the produce to the employee badge barcode 37 (e.g., employ identification number) of the employee.

Any known scanner 22 is anticipated including, but not limited to, hand-held, self-contained portable scanners and tethered scanners, as known in the industry. In embodiments in which the scanner is portable, the data collected is either sent by wireless methods or stored internally to the scanner 22 and sent or transferred at a later time. In embodiments in which the scanner is tethered (connected to a fixed computer base), the data collected is either sent by wired methods, wireless methods or stored internally to the scanner 22 or its associated fixed computer base and sent or transferred at a later time.

Figure 4:
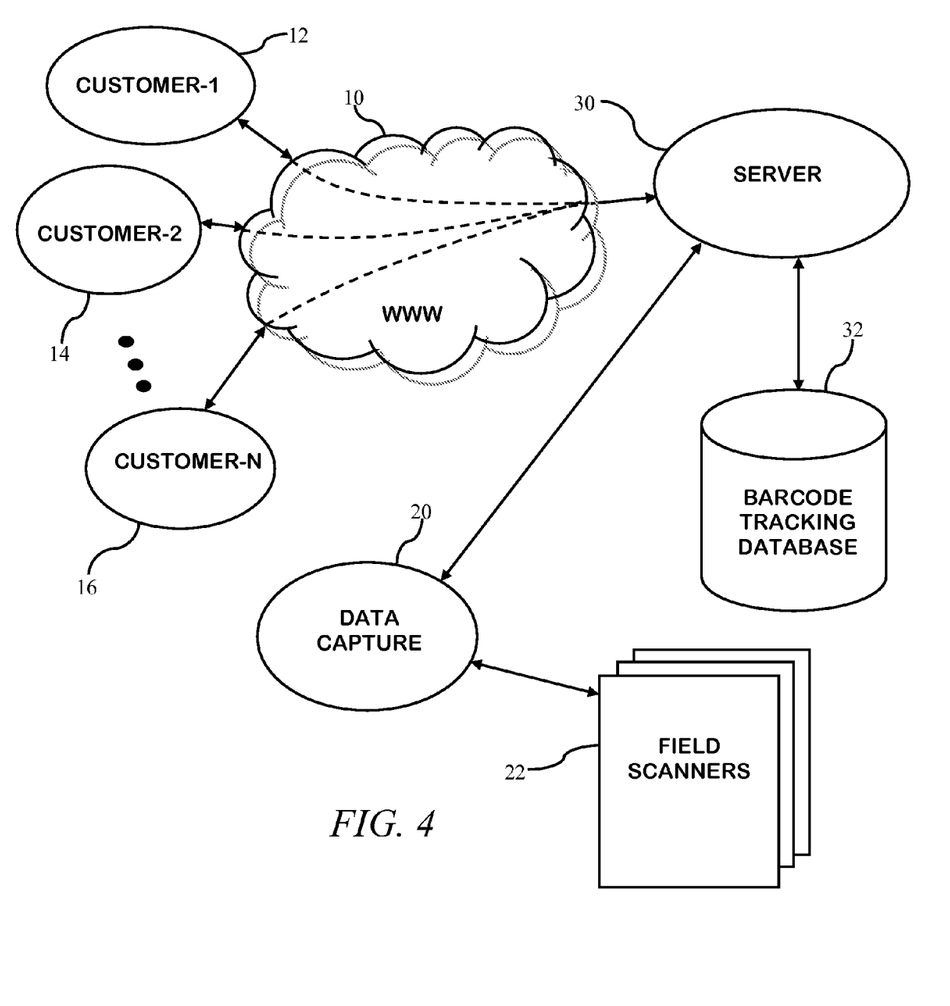
FIG. 4 illustrates a schematic view of a system of the present invention.

Referring to FIG. 4, a schematic view of a system of the present invention is shown. When the field box 33 is distributed to the picker 38, the barcode 40 on the label 42 and the barcode 37 on the picker's badge 36 are scanned by a portable scanner. In some embodiments, these barcodes 40/37 are stored and held at the scanner (field scanner) 22 until the scanner is connected to the server 30 for data capture 20. There are many ways to connect the scanner(s) 22 to the server 30 including, but not limited to, a wireless connection (e.g., 802.11, IRDA, other IR link), a wired connection (e.g., USB, DB9 Serial Port) and a wired connection within a cradle (e.g., USB, Serial) whereas the cradle also provides power for charging the scanner 22. In some embodiments, the server 30 is located remote to the scanners 22 and the data capture 22 is transmitted to the server 30 through a wide area network such as the internet 10.

The uploaded data contains a data record for each field box. The data record contains at least the barcode 40 of the field box 33 and an identification of the origin (e.g., a specific plot, field, row, etc). In some embodiments, the identification of the origin is defined by the barcode 37 of the picker 38 since the picker is assigned to a specific field, plot, etc. In some embodiments, the origin emanates from a stored value in the scanner 22. In some embodiments, the origin is keyed in or scanned into the scanner 22. In addition, in some embodiments, the data record also includes the barcode of the picker 37.

The uploaded data records are entered into a barcode tracking database 32 for future access and analysis. One use of the data records in the barcode tracking database 32 is to determine how many field boxes 33 were picked by a particular picker 38. Another use of the data records in the barcode tracking database 32 is to determine the origin of a given field box 33 for tracing to origin and/or for providing feedback to the grower regarding customer feedback.

In some embodiments, the server 30 is networked to the Internet 10 (WWW) and one or more customers 12/14/16 have access to an application in which the customers 12/14/16 enter the barcode 40 from a purchased clamshell box 34 and provide feedback regarding the quality, freshness, taste, etc. The feedback is added to the barcode tracking database 32 and is then accessible to the owner/manager of the originating farm(s).

Figure 5:
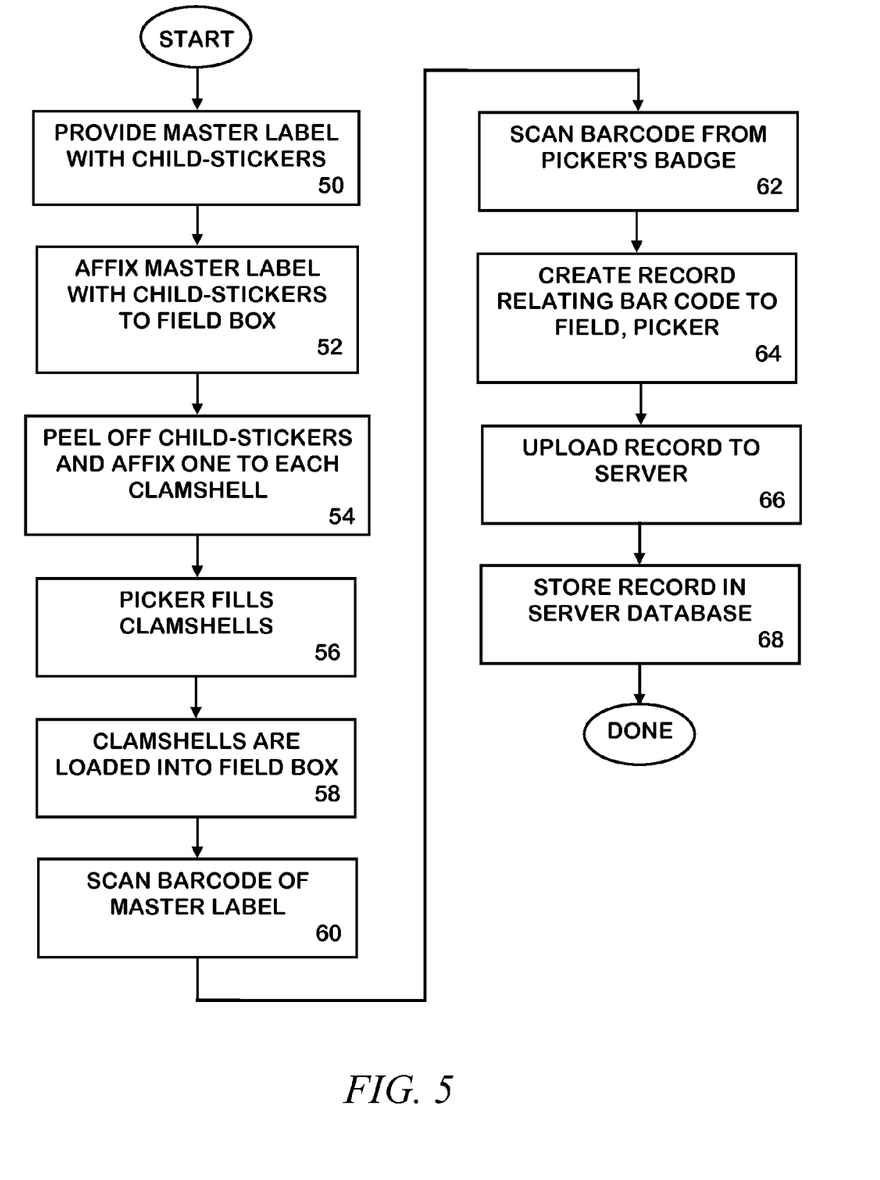
FIG. 5 illustrates a first flow chart of the present invention.

Referring to FIG. 5, a first flow chart of the present invention is shown. The tracking process begins with providing 50 a master label 42. In some embodiments, the master label 42 is provided on a roll. The master label 42 has a plurality of sub-labels 44. The barcode 40 on the master label 42 matches or relates to the sub-label identifier (e.g., barcode 43) on each of the sub-labels 44 and, the barcode is unique, in that, no other master label has the same barcode (at least statistically or during the expected life of the barcode).

The tracking process continues with affixing 52 a master label 42 to each field box 33 as the field box 33 is built or remanufactured/cleaned. In the preferred embodiment, the master label 42 is a peel-and-stick label and peeled from a backing and affixed to the field box 33, although other methods are well known in the industry, all of which are hereby included.

When the field box 33 is ready to be filled, the child stickers or sub-labels 44 are peeled off 54 and each one is affixed to a clamshell or sub-carton 34. Although the term "clamshell" is used throughout this description for simplicity, any carton or container is possible. For example, for strawberries, clear plastic clamshells 34 are often used, but alternately, a one-pint or two-pint wooden or plastic basket is sometimes used. The present invention is intended for any produce that is distributed in a plurality of containers and a subset of the plurality of containers is shipped in an over box (or field box as described above).

Next, the picker fills the clamshells with produce 56. In some embodiments, the picker fills the clamshells 34 with produce and later affixes the label, etc. The clamshells 34 are then loaded 58 into the field box 33.

Once the field box is filled with clamshells 34, the master label barcode 40 is scanned 60. In the preferred embodiment, a barcode 37 from the picker's badge 36 is also scanned to correlate the produce in the clamshells 34/field box 33 with the picker 38. In some embodiments, the scanner 22 is pre-programmed with an identification of the origin of the produce (e.g., field, row, plot, etc.). In some embodiments, the location of the field is entered on the scanner 22 to indicate the origin of the produce (e.g., field, row, plot, etc.). In some embodiments, the barcode from the picker's badge 37 is used to determine the origin of the produce (e.g., field, row, plot, etc.), being that the picker 38 is assigned to a particular field, row, plot, etc.

A data record is created 64 including the barcode 40 from the label 42 and the origin of the produce. Preferably, the origin of the produce is determined from the badge barcode 37 and, therefore, the data record includes the badge barcode 37. In some embodiments, the data record includes an identifier uniquely identifying the origin of the produce (field, row, plot, etc.).

At some time, one or more data records are uploaded 66 to the server 30 and the server 30 stores 68 the data record(s) in the barcode tracking database 32.

Figure 6:
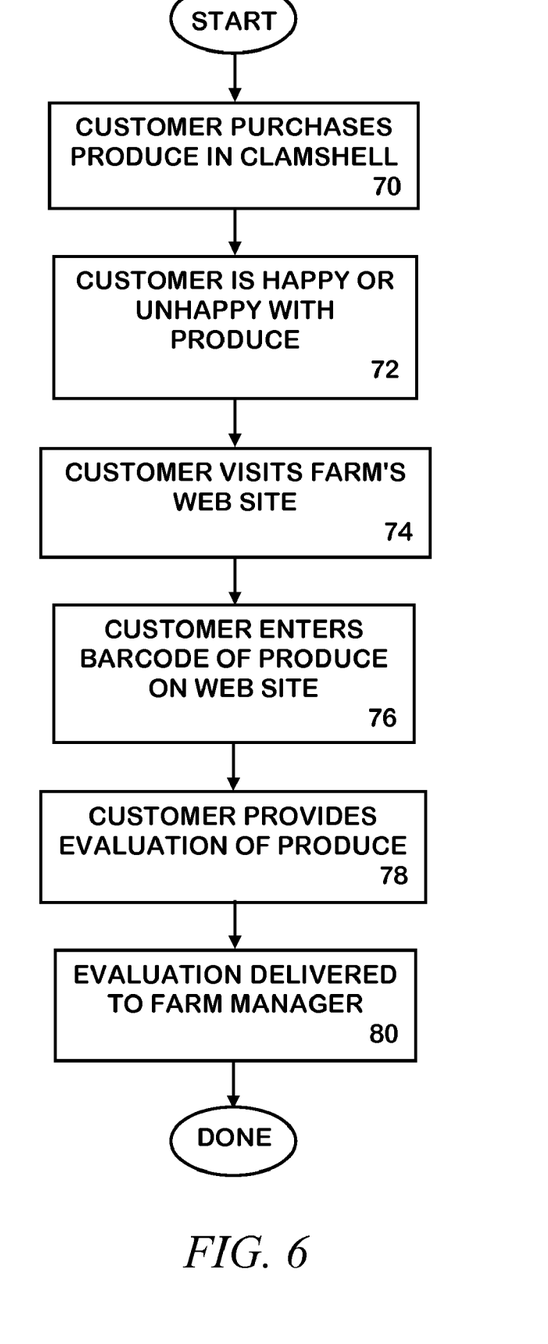
FIG. 6 illustrates a second flow chart of the present invention.

Referring to FIG. 6, a second flow chart of the present invention is shown. After a customer purchases the produce 70 and is either happy or unhappy with the produce 72, they are now able to provide feedback directly to the farm, picker and/or manager down to the package or plot level. In one embodiment, there is a web address (e.g., http://www.wish-farms.com) printed on the sub-label 44. The customer accesses the web address 74 and is presented with a user interface (such as that in FIG. 7). The customer enters the sub-label identifier (e.g., barcode 43 or series of characters) of from the sub-label 44 on the produce 76 into the user interface 76 then provides their evaluation of the produce 78. For example, the customer is unhappy because the produce is spoiled. Once the evaluation is completed by the customer, it is stored and available for delivery to the farm manager 80 or other person so that they can act upon the evaluation.

Figure 7:
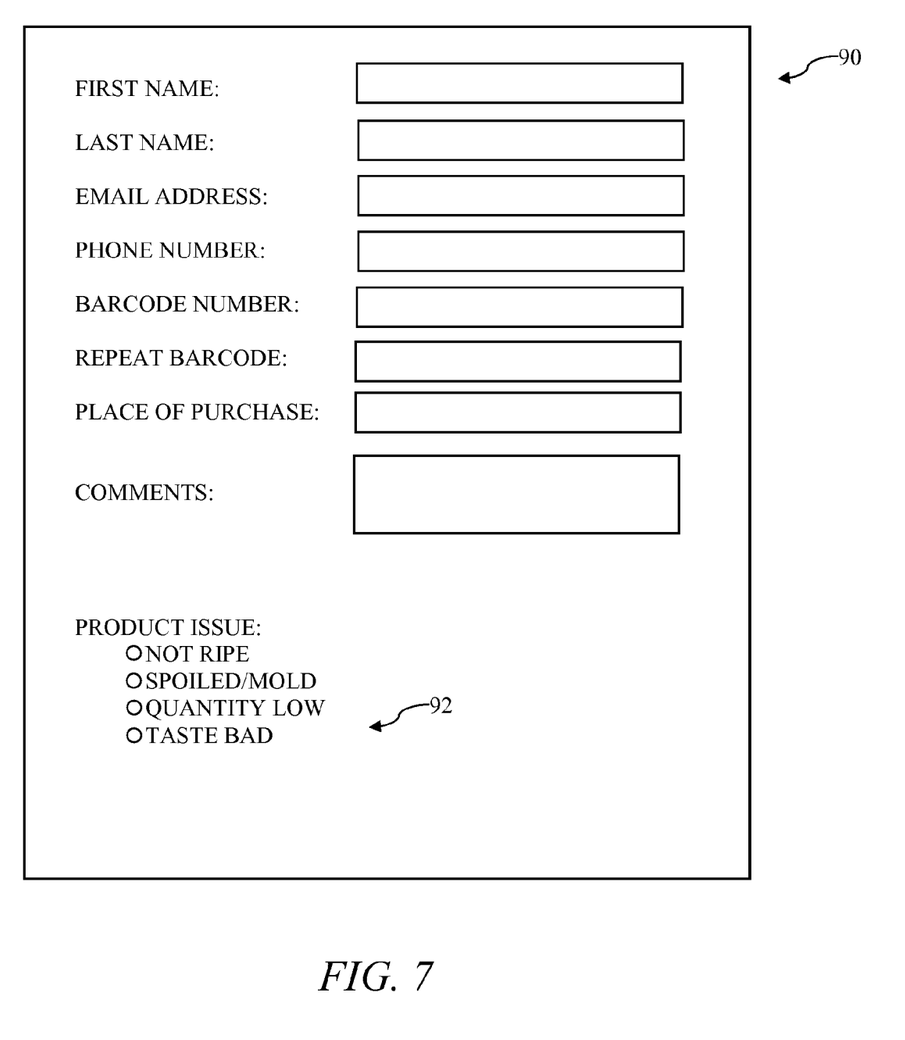
FIG. 7 illustrates a typical user interface of the present invention.

Referring to FIG. 7, a typical user interface of the present invention is shown. In this sample user interface 90, the customer enters contact information, including, in this example, their name, email address and phone number. In this example, the customer also indicates where they purchased the produce. The barcode 43 from the produce is entered in the appropriate fields and the customer has a field to enter a comment or simply check a box if their concern is covered by one of the bullet point 92. The fields shown are examples of one possible user interface. Many alternate user interfaces are known and included in the present application.

Figure 8:
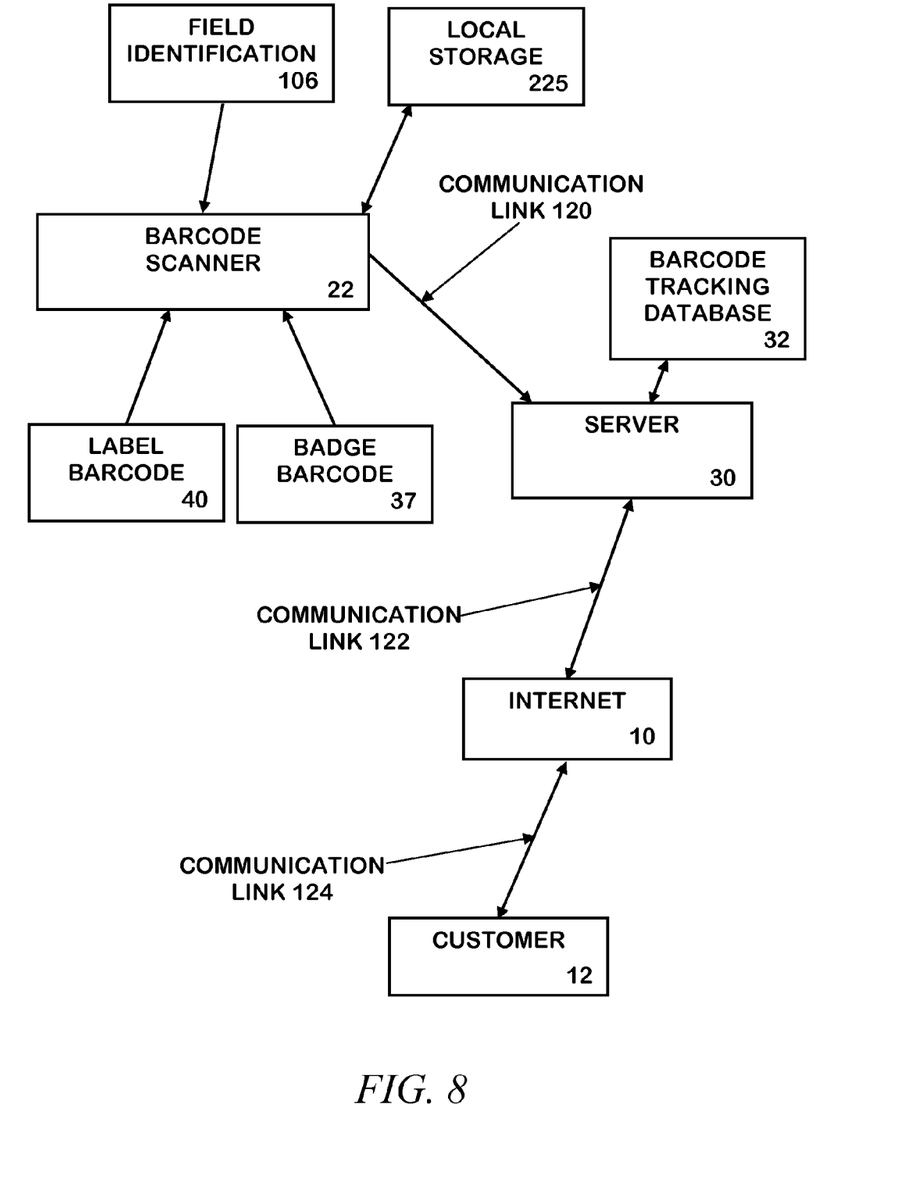
FIG. 8 illustrates a directed chart of the present invention.

Referring to FIG. 8, a directed chart of the present invention is shown. The label barcode 40 is captured by the scanner 22. In some embodiments, the badge barcode 37 is also captured by the scanner 22. In some embodiments, a field identification 106 is either entered on the scanner's 22 user interface or stored within the scanner's 22 memory. In some embodiments, the data collected is stored in local storage 225 for later transmission. Once the data is captured or at some time in the future, a data record for each field box 33 is transferred to the server, preferably over a communications link 120. In alternate embodiments, the data records are transferred by transferring a memory device such as a compact flash card or USB memory stick. The communications link 120 is any transmission link known in the industry, wired or wireless, such as 802.11, USB, Ethernet, Firewire, etc.

After the data records arrive at the server 30, they are stored in the barcode tracking database 32 for access in providing customer feedback, for determining picker performance and/or for tracking the origin of produce back to the field, row, plot, etc. For customer feedback, the server 30 is connected to the Internet 10 by a communications link 122. The communications link 122 is any transmission link known in the industry, wired or wireless, such as 802.11, USB, Ethernet, Firewire, etc. Likewise, the customer(s) is/are connected to the Internet by a communications link 124. This communications link 124 is any transmission link known in the industry, wired or wireless, such as 802.11, USB, Ethernet, Firewire, DOCSIS, Cable, FIOS, DSL, etc.

Figure 9:
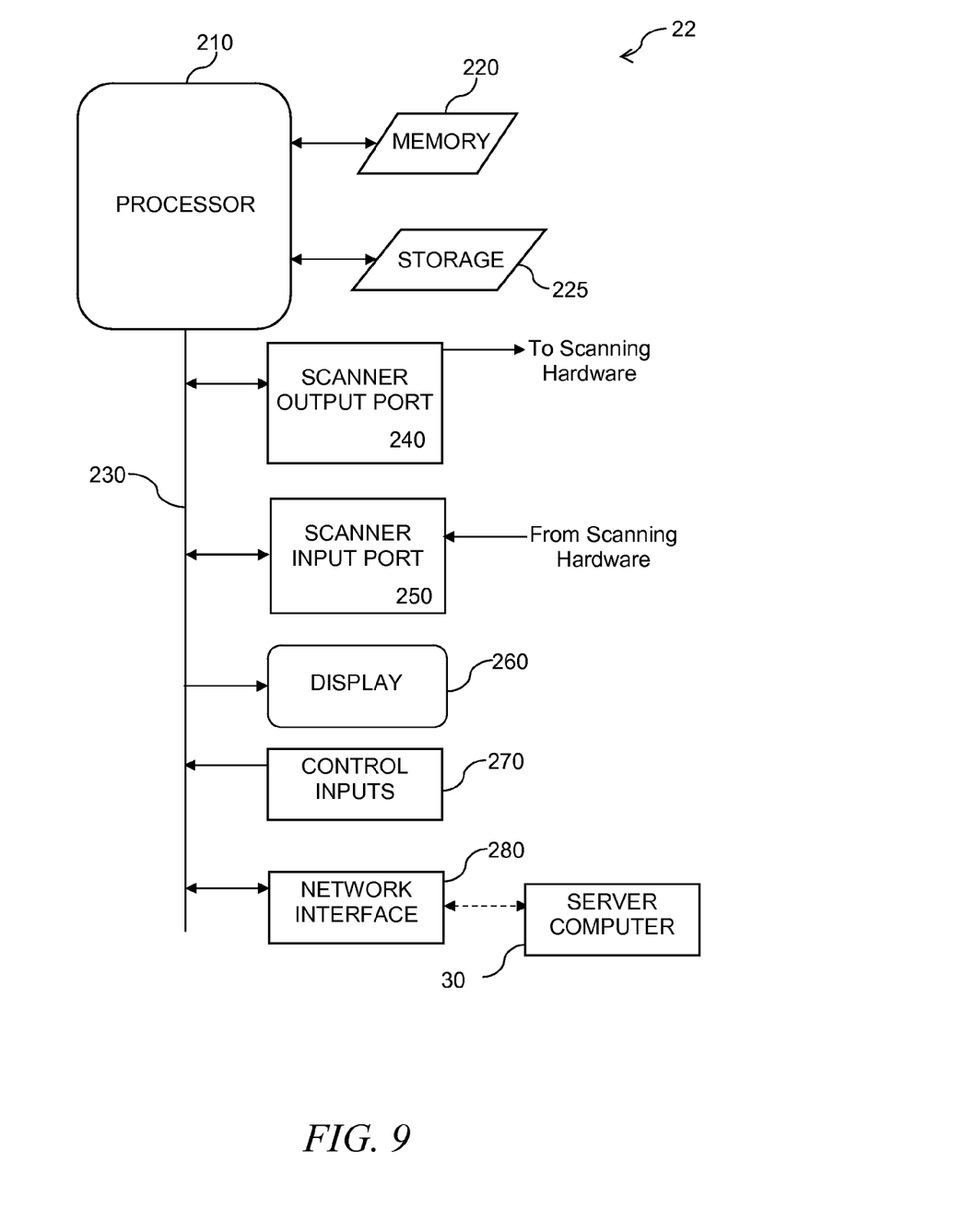
FIG. 9 illustrates a schematic view of a scanner of the present invention.

Referring now to FIG. 9, a schematic view of a barcode scanner of all embodiments of the present invention is shown. The barcode scanner 22 is shown for completeness and the device shown is a simplified example of a typical processor-based scanner that has a processor 210 and associated memory 220 and storage 225. The storage is, for example, Flash memory, battery-backed SRAM or a hard disk. This is an exemplary system and any suitable processor, memory and persistent storage can be substituted including microcontrollers such as the Intel® 80C51, processors such as the Intel® Pentium IV, memory such as SDRAM and DDR and persistent storage such as ROM, EPROM, hard disks, etc. The operating program, data parameters and scanned barcode containing records are typically stored in the persistent storage 225 A system bus 230 interfaces the processor to peripheral devices as discussed below.

The scanner 22 displays information, alerts, prompts, etc., on a display 260. In some embodiments, the display 260 is a graphics display. In some embodiments, the display 260 is a LCD display. In other embodiments, the display is a numeric display, alpha-numeric display, set of lights or any combination thereof. Operation of the system is initiated by control inputs 270. In some embodiments, the control inputs 270 include a keyboard. In other embodiments, the control 270 includes push buttons, switches, potentiometers and digital potentiometers, etc.

The scanner 22 controls the optical scanning hardware through a scanner control output port 240 as known in the industry. There are many known barcode scanning technologies, usually employing a lasing LED to illuminate the barcode while a detector measures reflected light to determine the digits of the barcode. All known barcode technologies including, but not limited to, linear barcodes, two-dimensional barcodes, matrix barcodes, two-dimensional stacked barcodes, postal barcodes, postnet postal barcodes and onecode postal barcodes are included, here within. Likewise, all known encodings of barcodes are also included here within.

Outputs from the scanning hardware are fed to the scanner processor 210 through a scanner input port 250.

The scanner interfaces to the server computer 30 through a network interface 280 connected to the system bus 230. In some embodiments, the part or all of the storage 225 is removable (e.g. SD, memory stick or Compact Flash) and the data records are transferred on the removable storage to the server computer 30.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for tracking produce delivered to a consumer, the system comprising:

a field box;

a plurality of containers for holding the produce, the containers fitting within the field box for shipment and the containers being within which the consumer will eventually obtain the produce;

a pre-printed master label affixed to the field box, the pre-printed master label having a master label barcode and the pre-printed master label having a plurality of sub-labels, each sub label having a sub-label identifier, the sub-label identifier being related to the master label bar-code, the master label barcode having a sequence of digital values, the sequence of digital values uniquely distinguishing the pre-printed master label;

a server;

a scanner;

software running on the scanner for capturing a value of the master label barcode and a produce origin;

software running on the scanner for transferring the value of the master label barcode and the produce origin to the server; and software running on the server for receiving the value of the master label barcode and the produce origin and software running on the server for storing the value of the master label barcode and the produce origin in a barcode tracking database.

2. The system for tracking produce delivered to a consumer of claim 1, wherein the sub-label identifier includes the sequence of digital values.

3. The system for tracking produce delivered to a consumer of claim 1, wherein the sub-label identifier includes the sequence of digital values along with additional digital values uniquely identifying each of the sub-label identifier.

4. The system for tracking produce delivered to a consumer of claim 1, further comprising an employee badge associated with a produce picker, the employee badge having an employee badge barcode; wherein the employee badge barcode is scanned and associated with the master label barcode.

5. The system for tracking produce delivered to a consumer of claim 4, wherein the produce origin is determined based upon the employee badge barcode.

6. The system for tracking produce delivered to a consumer of claim 1, wherein the produce origin is determined based upon a parameter stored in the scanner.

7. The system for tracking produce delivered to a consumer of claim 1, wherein the produce origin is scanned and stored in the scanner.

8. The system for tracking produce delivered to a consumer of claim 1, wherein the pre-printed master label has a sticky backing and is affixed to the field box.

9. The system for tracking produce delivered to a consumer of claim 8, wherein the sub-labels are peel-and-stick labels removably affixed to the master label and the sub-labels are peeled from the pre-printed master label and affixed to the containers.

10. A method for tracking produce delivered to a consumer, the method comprising:

providing a field box;

providing a plurality of containers for holding the produce, the containers fitting within the field box and the containers being within which the consumer will eventually obtain the produce;

providing a pre-printed master label, the pre-printed master label having a master label barcode and the pre-printed master label having a plurality of sub-labels, each sub label having a sub-label identifier, the sub-label identifier being related to the master label bar-code, the master label barcode having a sequence of digital values, the sequence of digital values uniquely distinguishing the pre-printed master label;

affixing the pre-printed master label to the field box;

peeling each of the sub-labels from the pre-printed master label and affixing each of the sub-labels to one of the containers;

filling the containers with the produce;

placing the containers into the field box;

capturing the master label barcode with a scanner;

transferring the captured master label barcode and a produce origin to a server; and receiving the captured master label barcode and the produce origin at the server and storing the captured master label barcode and the produce origin in a barcode tracking database.

11. The method for tracking produce delivered to a consumer of claim 10, wherein the sub-label identifier includes the sequence of digital values.

12. The method for tracking produce delivered to a consumer of claim 10, wherein the sub-label identifier includes the sequence of digital values along with additional digital values uniquely identifying each sub-label.

13. The method for tracking produce delivered to a consumer of claim 10, further comprising:

scanning an employee badge barcode with the scanner from an employee badge associated with a produce picker; and associating the employee badge barcode with the master label barcode.

14. The method for tracking produce delivered to a consumer of claim 13, wherein the produce origin is determined based upon the employee badge barcode.

15. The method for tracking produce delivered to a consumer of claim 10, wherein the produce origin is determined based upon a parameter stored in the scanner.

16. The method for tracking produce delivered to a consumer of claim 10, further comprising:

scanning the produce origin into the scanner.

17. The method for tracking produce delivered to a consumer of claim 10, further comprising:

accessing a feedback application through the internet;

entering the sub-label identifier into the feedback application; and entering feedback data into the feedback application regarding the produce.

18. The method for tracking produce delivered to a consumer of claim 10, further comprising:

accessing the captured master label barcode and the produce origin from barcode tracking database to determine the origin of produce, the produce having a health risk associated therewith.

19. A method for tracking produce delivered to a consumer, the method comprising:

providing a field box;

providing a plurality of clamshell containers for holding the produce, the clamshell containers fitting within the field box and the clamshell containers being within which the consumer will eventually obtain the produce;

providing a pre-printed master label, the pre-printed master label having a master label barcode and the pre-printed master label having a plurality of sub-labels, each sub label having a sub-label identifier, the sub-label identifier being related to the master label bar-code, the master label barcode having a sequence of digital values, the sequence of digital values uniquely distinguishing the pre-printed master label;

affixing the pre-printed master label to the field box;
peeling each of the sub-labels from the pre-printed master label and affixing each of the sub-labels to one of the clamshell containers;
filling the clamshell containers with the produce;
placing the clamshell containers into the field box;
delivering the field box to a harvest manager;
capturing the master label barcode with a scanner;
capturing an employee badge barcode from an employee badge with the scanner, the employee badge associated with a produce picker;
transferring the captured master label barcode and the employee badge barcode to a server; and
receiving the captured master label barcode and the employee badge barcode at the server and storing the captured master label barcode and the employee badge barcode in a barcode tracking database.

20. The method for tracking produce delivered to a consumer of claim 19, further comprising:
storing a produce origin in the scanner; and
transferring the produce origin along with the captured master label barcode and the employee badge barcode to the server.

* * * * *